US006502058B1

(12) United States Patent
Nakamura et al.

(10) Patent No.: US 6,502,058 B1
(45) Date of Patent: Dec. 31, 2002

(54) DEVICE FOR MEASURING THICKNESS OF A FORM DOCUMENT IN AN IMPACT PRINTER

(75) Inventors: Takashi Nakamura, Hitachinaka (JP); Toshio Hiki, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 72 days.

(21) Appl. No.: 09/663,384

(22) Filed: Sep. 15, 2000

(30) Foreign Application Priority Data

Sep. 17, 1999 (JP) ........................................... 11-263345

(51) Int. Cl.[7] ........................... G01B 11/02; B41J 11/20

(52) U.S. Cl. ........................... 702/170; 400/55; 400/56; 400/57; 400/59

(58) Field of Search ............................ 702/170; 400/56, 400/59, 60, 55, 161, 173, 57, 58, 157.3, 624, 625; 338/114

(56) References Cited

U.S. PATENT DOCUMENTS 3,990,560 A * 11/1976 Pavliscak et al. ........... 400/161
4,652,153 A * 3/1987 Kotsuzumi et al. ........... 400/56
4,676,675 A * 6/1987 Suzuki et al. ............... 338/114
5,087,135 A * 2/1992 Tew et al. .................... 400/55

* cited by examiner

*Primary Examiner*—John S. Hilten
*Assistant Examiner*—Hien Vo
(74) *Attorney, Agent, or Firm*—Whitham, Curtis & Christofferson, PC

(57) ABSTRACT

A thickness of a form document loaded in a pin feed tractor is measured to appropriately adjust a gap between a platen and a print head. A projection formed on a pressing block is linearly moved toward and away from the form document supported on a tractor cover. The pressing block is moved by a stepping motor, and an amount of rotations of the stepping motor is detected to measure the movement of the projection. A first amount of rotations is detected under a condition where the form document is not loaded and subsequently a second amount of rotations is detected under a condition where the form document is loaded. The thickness of the form document is computed based on a difference between the first amount of rotations and the second amount of rotations to eliminate influence of resilient deformation of the tractor cover.

17 Claims, 13 Drawing Sheets

FIG. 3

| OPERATION | REF. POSITION | START POSITION | Lf•l | Lf•m | Lf•s | Ls•s | Ls•m | Ls•l | PULSE RATE | MEASUREMENT |
|---|---|---|---|---|---|---|---|---|---|---|
| CHECK SWITCH CONTACT (CSC) | ◎ ◀ | ● | | | | | | | 100 PPS | – |
| IMPART WEAK PRESSING FORCE (WPF) | ○ | | | | | ▶ ○ PULL-OUT | | | 460 PPS | – |
| DISTANCE MEASUREMENT WHEN WPF IS IMPARATED | ◎ ◀ | | | | | ◎ | | | 100 PPS | Ss•s |
| IMPART MIDDLE PRESSING FORCE (MPF) | ○ | | | | | | ▶ ○ PULL-OUT | | 370 PPS | – |
| DISTANCE MEASUREMENT WHEN MPF IS IMPARATED | ◎ ◀ | | | | | | ◎ | | 100 PPS | Ss•m |
| IMPART STRONG PRESSING FORCE (SPF) | ○ | | | | | | | ▶ ○ PULL-OUT | 250 PPS | – |
| DISTANCE MEASUREMENT WHEN SPF IS IMPARATED | ◎ ◀ | | | | | | | ◎ | 100 PPS | Ss•l |
| RETRACT TO START POSITION (RTSP) | ○ | ▶ ● | | | | | | | 100 PPS | – |

FIG. 4

| OPERATION | REF. POSITION | START POSITION | Lf•l | Lf•m | Lf•s | Ls•s | Ls•m | Ls•l | PULSE RATE | MEASUREMENT |
|---|---|---|---|---|---|---|---|---|---|---|
| CHECK SWITCH CONTACT (CSC) | ○ ◀ | ● | | | | | | | 100 PPS | — |
| IMPART WPF PRESUMING A SINGLE SHEET OF PAPER IS LOADED | ○ | | | | ▶ ○ PULL-OUT | | | | 460 PPS | — |
| 1st DISTANCE MEASUREMENT (DM) | ◎ ◀ | | | | ◎ | | | | 100 PPS | Sf•s |
| IMPART MPF PRESUMING FIVE OR SIX SHEETS OF PAPER IS LOADED | ○ | | | ▶ ○ PULL-OUT | | | | | 370 PPS | — |
| 2nd DM | ◎ ◀ | | | ◎ | | | | | 100 PPS | Sf•m |
| IMPART SPF PRESUMING EIGHT SHEETS OF PAPER IS LOADED | ○ | | ▶ ○ PULL-OUT | | | | | | 250 PPS | — |
| 3rd CM | ◎ ◀ | | ◎ | | | | | | 100 PPS | Sf•l |
| RETRACT TO START POSITION (RTSP) | ○ | ▶ ● | | | | | | | 100 PPS | — |

FIG. 8

| OBJECT TO BE MEADURED | MEASURED THICKNESS (mm) | MEASURED STEP NUMBER Sx | CONTROLLABLE RANGE |
|---|---|---|---|
| | 0 | 0 | ↑ LIMIT VALUE |
| 45 Kg PAPER (ONE SHEET) | 0.063 | 6 | |
| 55 Kg PAPER (ONE SHEET) | 0.083 | 8 | MEASUREMENT OF ONE SHEET FORM |
| TACK PAPER (ONE SHEET) | 0.156 | 15 | |
| 135 Kg PAPER (ONE SHEET) | 0.199 | 19 | ↓ BOUNDARY |
| — | 0.260 | 25 | ↑ |
| PRESSURE-SENSITIVE PAPER (5 SHEETS) | 0.303 | 30 | MEASUREMENT OF FORM WITH 5 OR 6 SHEETS |
| CHAIN STORE COMMON FORM (5 SHEETS) | 0.354 | 34 | |
| CARBON PAPER (6 SHEETS) | 0.365 | 35 | ↓ BOUNDARY |
| — | 0.438 | 42 | ↑ |
| COURIER FORM (8 SHEETS) | 0.500 | 48 | MEASUREMENT OF FORM WITH 8 SHEETS |
| FORM FOR BAGGAGE DELIVERY BY POST (8 SHEETS) | 0.635 | 61 | |
| GAP OF PAPER PATH ON PIN FEED TRACTOR | 0.7 | 67 | ↓ LIMIT VALUE |

DEVICE FOR MEASURING THICKNESS OF A FORM DOCUMENT IN AN IMPACT PRINTER

BACKGROUND OF THE INVENTION

1. Field of the Invention

The present invention relates to a device for measuring the thickness of a form document set in an impact printer, such as a dot line printer, and more particularly to a form thickness measuring device for measuring thickness of a continuous form consisting of a single or plural stacked sheets of paper.

2. Description of the Related Art

Conventional impact serial printers include a print head and a platen for supporting a print paper or a form document thereon. The gap between the print head and the platen is determined depending upon the thickness of the form document so that hammers mounted on the print head can make impressions of dots on the form supported on the platen.

It should be noted that not only a form with a single sheet of paper but also a form with plural stacked sheets of paper can be used in the impact printers.

Unlike impact serial printers, dot line printers print on form documents by striking hammers, which are mounted on a 13.6 inch width print head, against the forms with a relatively strong force. Therefore, the gap between the print head and the platen needs to be precisely determined depending upon the thickness of the form. Nevertheless, there has been no form thickness measuring device for use in the dot line printer, that is low in manufacturing cost, simple in construction, and easy to operate.

SUMMARY OF THE INVENTION

In view of the foregoing, it is an object of the present invention to provide a thickness measuring device capable of measuring a thickness of a form having a variable thickness, which is low in cost and high in accuracy.

To achieve the above and other objects, there is provided a thickness measuring device including a substrate; a stepping motor supported on the substrate and having a rotor shaft forwardly and reversely rotatable about its own axis; a translating mechanism for translating rotations of the rotor shaft into a linear movement; a pressing block formed with a projection, the pressing block being coupled to the rotor shaft through the translating mechanism for moving the projection toward and away from an object to be measured supported on a supporting plate in accordance with forward and reverse rotations of the stepping motor; and a control unit for controlling the stepping motor to move the projection from a predetermined fixed position to the object and then to backwardly move the projection from the object to the predetermined fixed position, and for computing a thickness of the object based on an actual amount of rotations of the stepping motor detected when the projection is moved a one-way distance between the predetermined fixed position and the object.

The control unit includes a non-volatile memory storing therein a reference amount of rotations of the stepping motor corresponding to a distance between the predetermined fixed position and the supporting plate, and computing means for computing the thickness of the object based on a subtracted amount of rotations obtained by subtracting the actual amount of rotations from the reference amount of rotations.

The control unit controls the stepping motor to move the projection from the predetermined fixed position to the supporting plate and then to backwardly move the projection from the object to the predetermined fixed position, and the control unit further includes detection means for detecting the reference amount of rotations of the stepping motor by moving the projection a one-way distance between the predetermined fixed position and the supporting plate. The detection means stores the reference amount of rotations in the non-volatile memory.

A first set of data including the actual amount of rotations and the reference amount of rotations is detected while rotating the stepping motor at a first pulse rate. The computing means further computes a first subtracted amount of rotations based on the first set of data. The control unit further includes comparison means for comparing the first subtracted amount of rotations with a first reference value, and determining means for determining that the object falls into a first range of thickness when the comparison means indicates that the first subtracted amount of rotations is less than the first reference value and that the object is out of the first range of thickness when the comparison means indicates that the first subtracted amount of rotations is equal to or greater than the first reference value.

A second set of data including the actual amount of rotations and the reference amount of rotations is detected while rotating said stepping motor at a second pulse rate lower than the first pulse rate. The computing means further computes a second subtracted amount of rotations based on the second set of data. The comparison means further compares the second subtracted amount of rotations with a second reference value greater than the first reference value, and the determining means further determines that the object falls into a second range of thickness when the comparison means indicates that the second subtracted amount of rotations is greater than the first reference value but less than the second reference value and that the object falls into a third range of thickness when said comparison means indicates that the second subtracted value is greater than the second reference value. The values in the first range of thickness is smaller than values in the second range of thickness, and the values in the second range of thickness is smaller than values in the third range of thickness.

When the determining means determines that the object falls into the third range of thickness, the control unit controls the stepping motor to rotate at a third pulse rate lower than the second pulse rate to compute the thickness of the object.

The control unit computes the thickness of the object based on the first subtracted amount of rotations when the determining means determines that the object falls into the first range of thickness. The control unit computes the thickness of the object based on the second subtracted amount of rotations when the determining means determines that the object falls into the second range of thickness.

A third set of data including the actual amount of rotations and the reference amount of rotations is detected while rotating the stepping motor at the third pulse rate lower than the second pulse rate. The computing means further computes a third subtracted amount of rotations based on the third set of data, and the control means computes the thickness of the object based on the third set of data.

In accordance with the thickness measurement of the invention, the thickness of the object can be obtained with high accuracy because the measured thickness is free from influence of resilient deformation of the supporting plate supporting the object to be measured.

According to another aspect of the present invention, there is provided a printer including a print head, a pin feed tractor, and a form thickness measuring device. The pin feed tractor feeds a form document past the print head, and has a tractor plate and a tractor cover arranged in parallel with each other to form a gap therebetween into which the form document is inserted.

The form thickness measuring device includes a substrate; a stepping motor supported on the substrate and having a rotor shaft forwardly and reversely rotatable about its own axis; a translating mechanism for translating rotations of the rotor shaft into a linear movement; a pressing block formed with a projection, the pressing block being coupled to the rotor shaft through the translating mechanism for moving the projection toward and away from the form document supported on the tractor cover through an opening formed on the tractor plate in accordance with forward and reverse rotations of the stepping motor; and a control unit. The control unit controls the stepping motor to move the projection from a predetermined fixed position to the form document and then to backwardly move the projection from the form document to the predetermined fixed position. The control unit further compute a thickness of the form document based on an actual amount of rotations of the stepping motor detected when the projection is moved a one-way distance between the predetermined fixed position and the form document.

The control unit further controls the stepping motor to move the projection from the predetermined fixed position to the tractor cover and then to backwardly move the projection from the tractor cover to the predetermined fixed position. The the control unit includes detection means for detecting a reference amount of rotations of the stepping motor by moving the projection a one-way distance between the predetermined fixed position and the tractor cover, a non-volatile memory, the detection means storing the reference amount of rotations in the non-volatile memory, and computing means for computing a difference between the actual amount of rotations and the reference amount of rotations, and computing the thickness of the form document based on the difference.

The control unit further comprises pulse rate changing means for changing a pulse rate of the rotations of the stepping motor, the pulse rate changing means changes the pulse rate based on the difference.

The pulse rate changing means decreases the pulse rate used for moving the projection from the predetermined fixed position to the form document and to the tractor cover when the difference is greater than a reference value.

According to another aspect of the present invention, there is provided a method of measuring the form thickness.

BRIEF DESCRIPTION OF THE DRAWINGS

The particular features and advantages of the invention as well as other objects will become apparent from the following description taken in connection with the accompanying drawings, in which:

FIG. 3 is an explanatory diagram illustrating measurement of a reference distance;

FIG. 4 is an explanatory diagram illustrating measurement of an actual distance;

FIG. 8 is an explanatory diagram illustrating how to determine reference values used for discriminating forms;

DETAILED DESCRIPTION OF THE PREFERRED EMBODIMENT

A preferred embodiment of the present invention will now be described with reference to the accompanying drawings.

Figure 1:
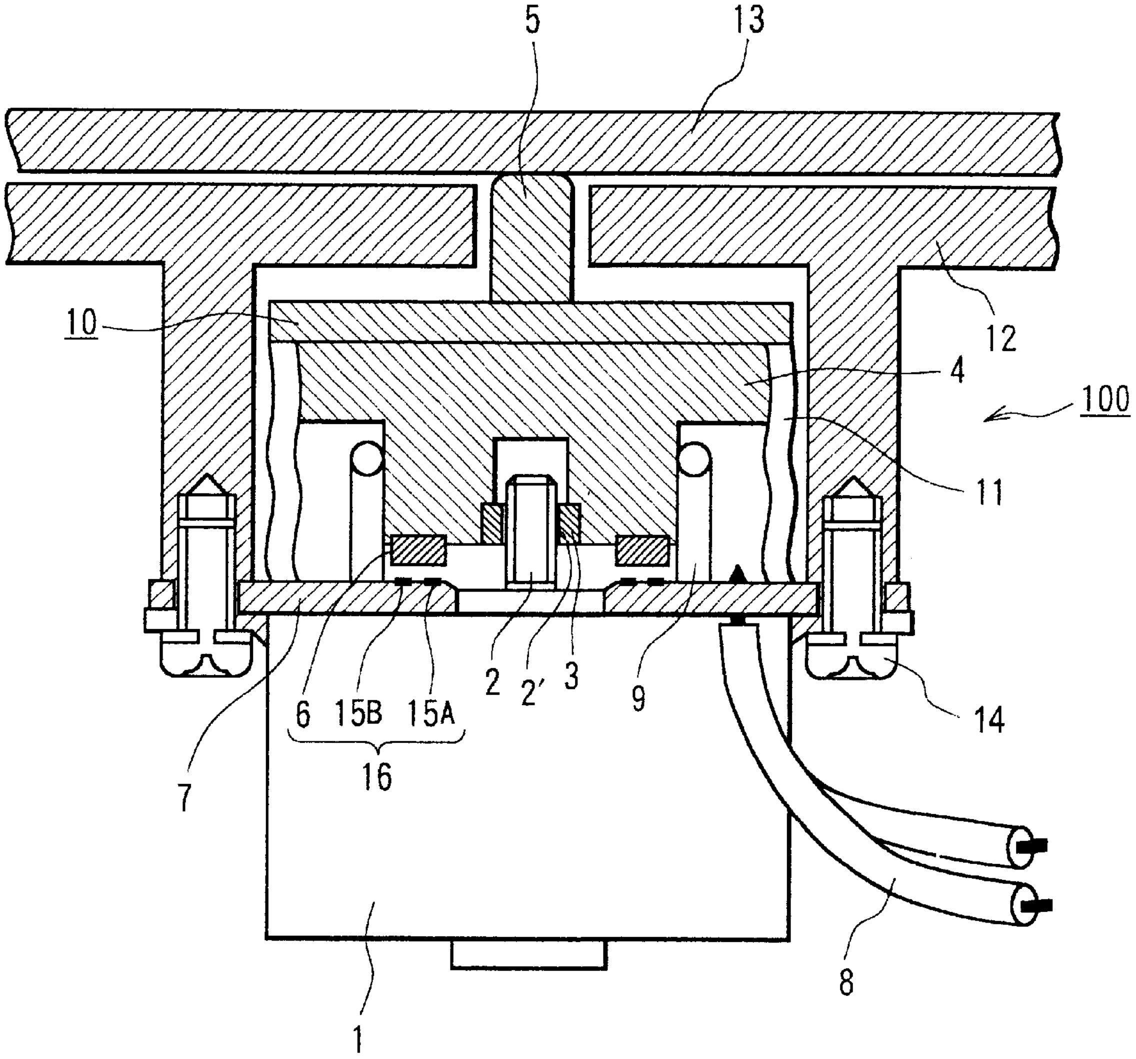
FIG. 1 is a cross-sectional view showing a form thickness measuring device according to an embodiment of the present invention.

FIG. 1 shows a form thickness measuring device which is generally designated by reference numeral 100.

The form thickness measuring device 100 includes a gap measuring sensor 10, a stepping motor 1, a stepping motor control circuit 20 to be described later with reference to FIG. 5, and a stepping motor drive circuit 30 also to be described later with reference to FIG. 5.

The gap measuring sensor 10 includes a pressing block 4, a projection 5 formed on the pressing block 4, a guide member 9, and a switch 16 which includes a washer 6 and contact points 15A and 15B. The stepping motor 1 is of a permanent magnet type and is relatively small in size with an outer diameter of 35 mm. The stepping motor 1 is supported on a substrate 7. A male screw portion 2' with a screw diameter of 3 mm and a screw pitch of 0.5 mm is formed in part of the rotor shaft 2 of the stepping motor 1.

The pressing block 4 can be divided into three segments in terms of the outer size. The first segment is the smallest in outer size and has an end face confronting the substrate 7. The second segment has a middle outer size and the third part has the largest outer size. A projection 5 is formed on the third segment of the pressing block 4.

The first segment of the pressing block 4 is formed with a hole with which a nut 3 formed with a female screw portion is force-fitted. The female screw portion of the nut 3 threadingly engages the male screw portion 2' of the rotor shaft 2. The first segment of the pressing block 4 has a square outer shape, and the second and third segments of the pressing block 4 have a circular outer shape.

A pair of guide members 9 are disposed to contact two opposite outer surfaces of the first segment of the pressing block 4. By virtue of the guide members 9, the pressing block 4 is prevented from rotating with the rotor shaft 2. The threading engagement between the rotor shaft 2 and the pressing block 4 translates the rotations of the rotor shaft 2 into linear movement of the pressing block 4. That is, the pressing block 4 linearly moves in the direction in which the rotor shaft 2 extends. More specifically, when the stepping motor 1 rotates clockwise as viewed from the substrate 7 (hereinafter referred to as "forward rotation"), the pressing block 4 moves away from the substrate 7 whereas when the stepping motor 1 rotates counter-clockwise as viewed from the substrate 7 (hereinafter referred to as "reverse rotation"), the pressing block 4 moves toward the substrate 7.

The washer 6 with gold plating on its surface is attached to the end face of the first segment of the pressing block 4. On the other hand, a pair of contact points 15A and 15B with gold plating on their surfaces are mounted on the substrate 7 in positions confronting the washer 6. The washer 6 and the pair of contact points 15A and 15B form the switch 16. When the washer 6 is brought into contact with the contact points 15A and 15B, the switch 16 is rendered ON whereas when the washer 6 is isolated from the contact points 15A and 15B, the switch 16 is rendered OFF.

A cylindrical rubber curtain 11 is attached to the peripheral surface of the second segment of the pressing block 4 to enclose the first segment of the pressing block 4. Free end of the rubber curtain 11 is urged against the substrate 7 to an extent that the rubber curtain 11 is slightly resiliently deformed. The washer 6 and contact points 15A and 15B are confined in a closed space defined by the cylindrical rubber curtain 11, so that a malfunction of the switch does not occur due to dusts entering into the space.

Figure 12:
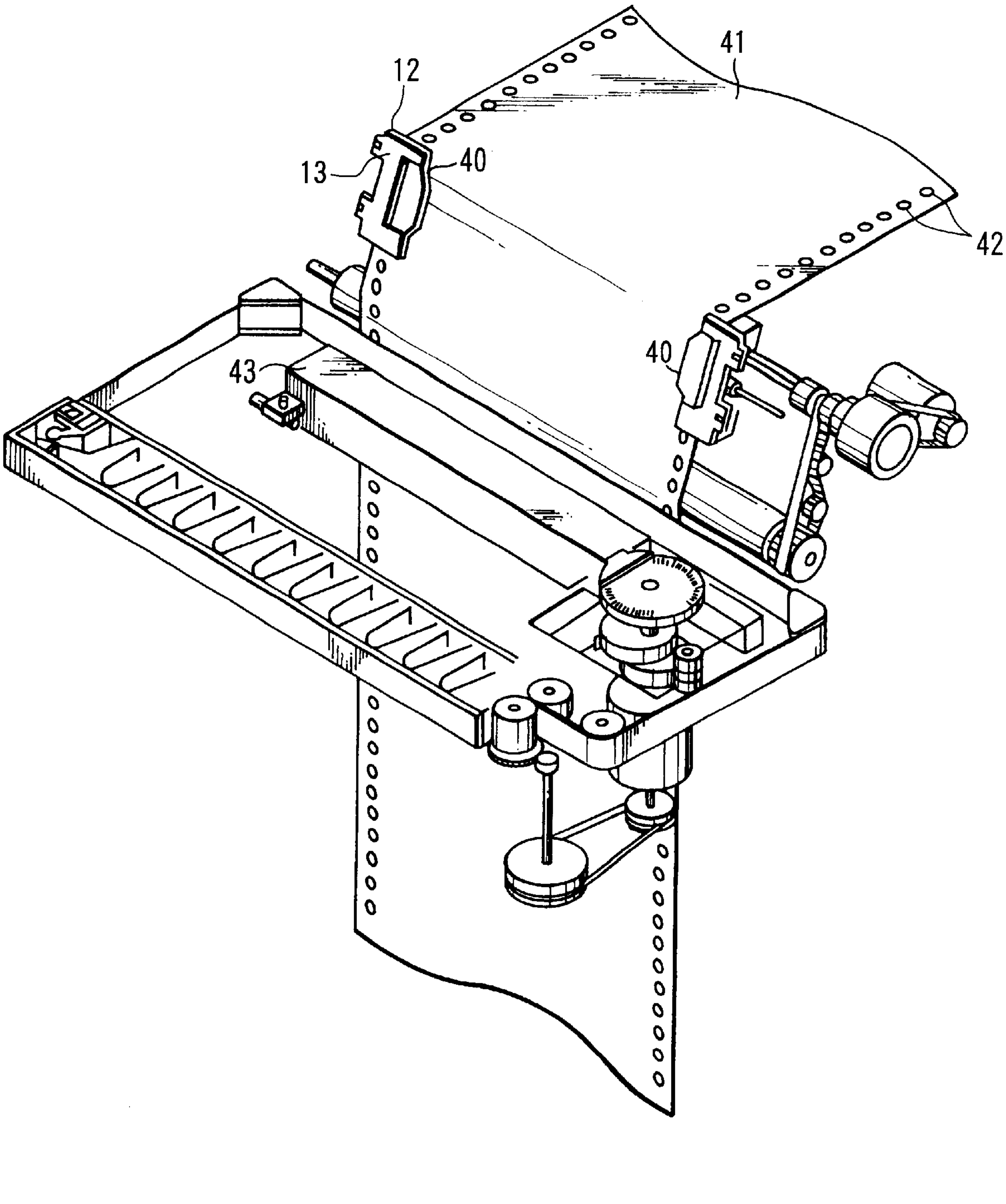
FIG. 12 is a perspective view showing a dot line printer.

The gap measuring sensor 10 with the above-described configuration is provided in a pin feed tractor. As shown in FIG. 12, the pin feed tractor 40 is provided for moving a continuous form 41 past a print head 43 while drivingly engaging with uniformly-spaced perforations 42 formed in the side margins of the continuous form 41. The pin feed tractor 40 includes a tractor plate 12 and a tractor cover 13 arranged in parallel with each other with a gap of 0.7 mm therebetween into which the continuous form is inserted. As shown in FIG. 1, the tractor plate 12 and the tractor cover 13 are oriented in a direction perpendicular to the axial direction of the rotor shaft 2. For simplifying the following description, the surface of the tractor plate 12 forming the gap with the tractor cover 13 will be referred to as "inner surface" of the tractor cover 12. Also, the surface of the tractor cover 13 forming the gap with the tractor plate 12 will be referred to as "inner surface" of the tractor cover 13.

The gap measuring sensor 10 is fixed to the tractor plate 12 with screws 14. The tractor plate 12 is formed with a through-hole into which the projection 5 is inserted. The top end of the projection 5 faces the inner surface of the tractor cover 13.

In accordance with forward and reverse rotations of the stepping motor 1, the projection 5 moves toward and away from the tractor cover 13. With two complete forward rotations of the rotor shaft 2, the projection 5 moves 1.0 mm toward the inner surface of the tractor cover 13. Conversely, with two complete reverse rotations of the rotor shaft 2, the projection 5 moves 1.0 mm away from the inner surface of the tractor cover 13. In this embodiment, when the washer 6 is in the reference position, the top end of the projection 5 is located at a position 0.3 mm down from the inner surface of the tractor plate 12. Therefore, from this position, the top end of the projection 5 will be brought into contact with the inner surface of the tractor cover 13 with two forward rotations of the rotor shaft 2. Note that the gap between the tractor cover 13 and the tractor plate 12 is 0.7 mm, so the distance between the top end of the projection 5 and the inner surface of the tractor cover 13 is 1 mm (=0.7 mm+0.3 mm) when the washer 6 is in the reference position.

When the form is transported by the pin feed tractor, the projection 5 is held in a position where the top end thereof is back about 0.2 mm from the inner surface of the tractor plate 12 so that the transportation of the form is not hindered by the projection 5. With the use of the stepping motor 1 that rotates 7.5° per one step, the number of steps per one rotation is calculated by the following equation:

$$360°/7.5°=48 \text{ steps/rotation.}$$

Because the male screw portion 2' formed on the rotor shaft 2 has a pitch of 0.5 mm, the moving distance of the projection 5 per one step of the stepping motor 1 is calculated by the following equation:

$$0.5 \text{ mm}/48 \text{ steps}=0.0102 \text{ mm/step.}$$

Accordingly, the movement of the projection 5 can be controlled with a resolution of about 1/100 mm.

Figure 5:
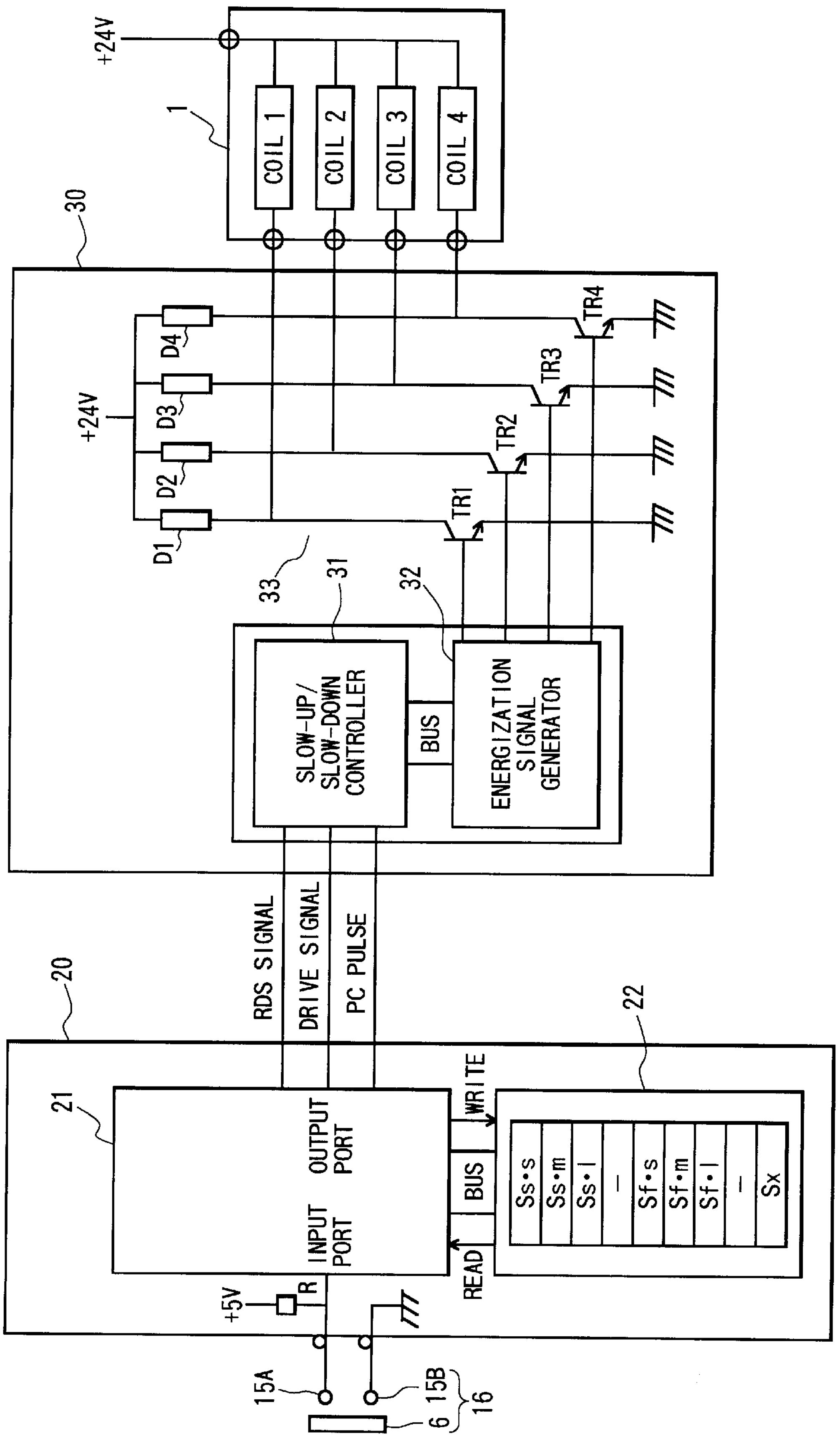
FIG. 5 is a block diagram showing a control circuit and a driving circuit of the form thickness measuring device according to the embodiment of the present invention.
Figure 6:
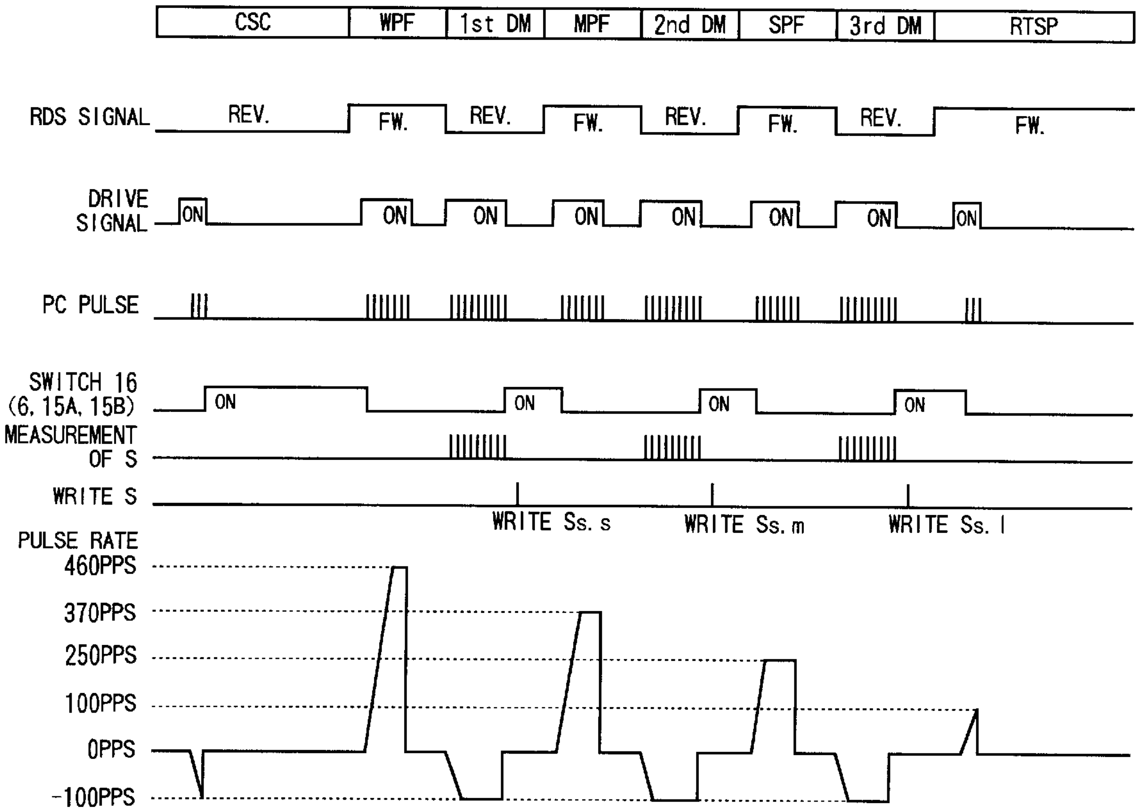
FIG. 6 is a time chart illustrating operations of the control circuit and the drive circuit according to the embodiment of the present invention.
Figure 7:
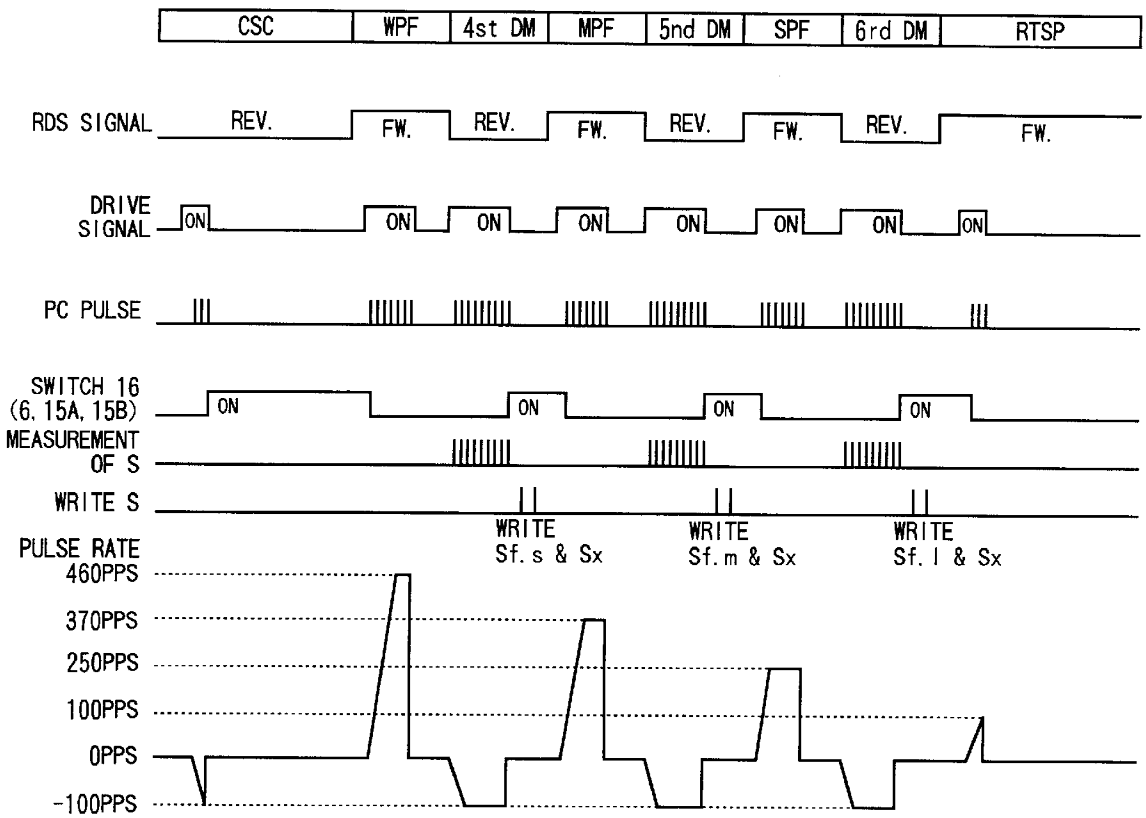
FIG. 7 is another time chart illustrating operations of the control circuit and the drive circuit according to the embodiment of the present invention.

FIG. 5 shows, in block form, the stepping motor control circuit 20, the stepping motor drive circuit 30 connected to the control circuit 20, and the stepping motor 1 connected to the drive circuit 30. The control circuit 20 includes a microcomputer 21 and a non-volatile memory 22 connected to the microcomputer 21 through a bus. The microcomputer 21 has an input port connected to the switch 16 for receiving ON/OFF signal of the switch 16, and an output port for outputting a rotational direction set (RDS) signal, a drive signal, and phase change (PC) pulses to the drive circuit 30. The number of phase change pulses (Ss.s, Ss.m, Ss.l, Sf.s, Sf.m. Sf.l) output to the driver circuit 30 and results (Sx) of prescribed arithmetic operations to be described later are written in and read from the memory 22 when the case demands.

The drive circuit 30 includes a slow-up/slow-down controller 31, an energization signal generator 32, and a driver 33. The slow-up/slow-down controller 31 is supplied with the drive signal for energizing the stepping motor 1, the phase change pulses for changing phases 1 to 4, and the rotational direction set signal for designating the rotational direction of the motor 1. The slow-up/slow-down controller 31 and the energization signal generator 32 are connected by a bus, and the energization signal generator 32 is connected to the driver 33. The driver 33 includes four parallel circuits, each including a diode (D1 to D4) and a transistor (TR1 to TR4) connected in series between a power source (+24V) and ground. The outputs of the energization signal generator 32 are connected to the respective ones of the bases of transistors TR1 to TR4 to selectively render the transistors ON. With the above-described arrangement, the drive circuit 30 drives the stepping motor 1 in two-phase energization.

The stepping motor 1 includes coils 1 to 4 supplied with a DC 24 V. The coils 1 to 4 are connected to the driver 33 and selectively and sequentially energized by the drive circuit 30. The rotor of the stepping motor 1 is incrementally moved through a series of discrete movements or steps as a result of a corresponding number of discrete changes in the energization of the windings of the stator of the stepping motor 1.

Next, the concept of the form thickness measurement according to the embodiment of the present invention will be described with reference to FIGS. 3 and 4. Firstly, a, reference distance will be measured with the form unloaded. The reference distance indicates a distance from the top end of the projection 5 held in a position where the washer 6 is in contact with the contact points 15A and 15E (hereinafter the position on the contact points 15A an d 15B will be referred to as "reference position") to the inner surface of the tractor cover 13. Then, an actual distance will be measured with the form loaded. The actual distance indicates a distance from the top end of the projection 5 when the washer 6 is in the reference position to the form supported on the tractor cover 13.

Referring to FIG. 3, measurement of the reference distance will be described.

Figure 2:
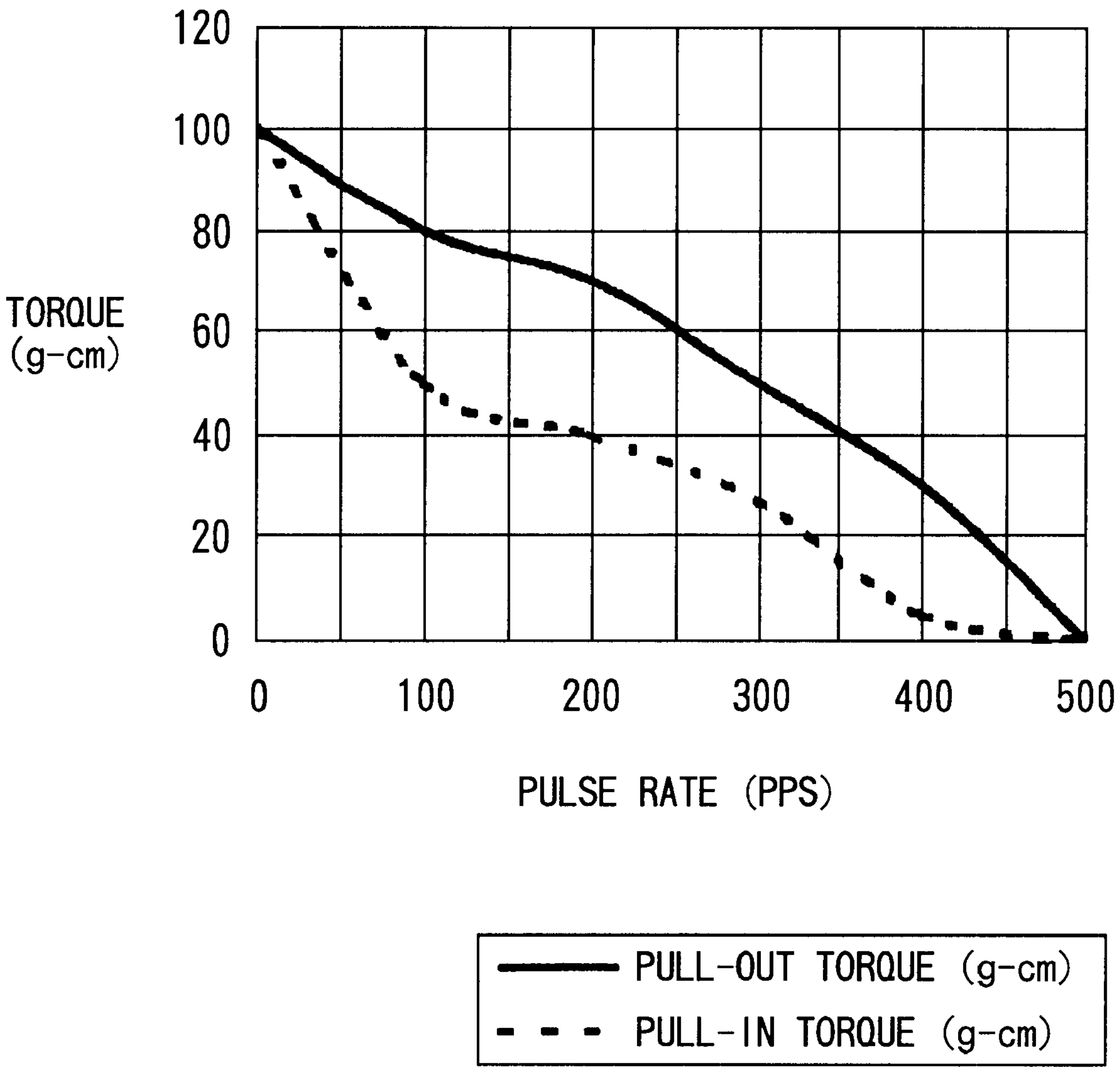
FIG. 2 is a graphical representation showing pulse rate versus torque characteristic curves of a stepping motor used in the form thickness measuring device shown in FIG. 1.

Firstly, the contact of the switch 16 is checked. Before checking the switch contact, the washer 6 is positioned in a start position where the washer 6 is separated from the contact points 15A and 15B. From this condition, the pressing block 4 is moved toward the substrate 7 by reversely rotating the stepping motor 1 at a pulse rate of 100 PPS. When the washer 6 impinges against the contact points 15A and 15B, i.e., when the switch 16 is ON, the stepping motor 1 stops its rotation. As shown in FIG. 2, when a load exceeding a pull-out torque is imparted upon the stepping motor 1, the rotor shaft 2 is pulled out and stops its rotation.

When it is confirmed that the switch 16 is in order, the projection 5 is moved toward the tractor cover 13 to impart weak pressing force upon the tractor cover 13. To this end, the stepping motor 1 is forwardly rotated at a high pulse rate (460 PPS). High pulse rate rotations of the stepping motor 1 impart weak pressing force upon the tractor cover 13. When the projection 5 impinges against the tractor cover 13, the stepping motor 1 is pulled out and stops its rotation. In this condition, the washer 6 is positioned Ls.s away from the reference position.

Next, measurement of distance Ls.s is performed. To this end, the stepping motor 1 is reversely rotated at a low pulse rate (100 PPS) until the washer 6 moves back to the reference position. The number of phase change pulses (Ss.s) generated during the reversal movement of the stepping motor 1 is counted and stored in the non-volatile memory 22. The number of phase change pulses Ss.s is representative of the distance Ls.s. In order that the stepping motor 1 may not be pulled out before the washer 6 arrives at the reference position, a low pulse rate (100 PPS) is selected to generate strong torque.

Next, the projection 5 is moved toward the tractor cover 13 to impart middle pressing force upon the tractor cover 13. To this end, the stepping motor 1 is forwardly rotated at a middle pulse rate (370 PPS). Middle pulse rate rotations of the stepping motor 1 impart middle pressing force upon the tractor cover 13 when the projection 5 impinges against the tractor cover 13. When the projection 5 impinges against the tractor cover 13, the stepping motor 1 is pulled out and stops its rotation. In this condition, the washer 6 is positioned Ls.m away from the reference position.

Next, measurement of the distance Ls.m is performed. To this end, the stepping motor 1 is reversely rotated at a low pulse rate (100 PPS) until the washer 6 moves back to the reference position. The number of phase change pulses (Ss.m) generated during the reversal movement of the stepping motor 1 is counted and stored in the non-volatile memory 22. The number of phase change pulses Ss.m is representative of the distance Ls.m. In order that the stepping motor 1 may not be pulled out before the washer arrives at the reference position, a low pulse rate (100 PPS) is again selected to generate strong torque.

Next, the projection 5 is moved toward the tractor cover 13 to impart strong pressing force upon the tractor cover 13. To this end, the stepping motor 1 is forwardly rotated at a low pulse rate (250 PPS). Low pulse rate rotations of the stepping motor 1 impart high pressing force upon the tractor cover 13 when the projection 5 impinges against the tractor cover 13 when the projection 5 impinges 77 upon the tractor cover 13, the stepping motor 1 is pulled out and stops its rotation. In this condition, the washer 6 is positioned Ls.l away from the reference position.

Next, measurement of distance Ls.l is performed. To this end, the stepping motor 1 is reversely rotated at a low pulse rate (100 PPS) until the washer 6 moves back to the reference position. The number of phase change pulses (Ss.l) generated during the reversal movement of the stepping motor 1 is counted and stored in the non-volatile memory 22. The number of phase change pulses Ss.l is representative of the distance Ls.l. In order that the stepping motor 1 may not be pulled out before the washer 6 arrives at the reference position, a low pulse rate (100 PPS) is selected to generate strong torque.

After measurement of three values Ss.s, Ss.m and Ss.l, the stepping motor 1 is forwardly rotated at a pulse rate of 100 PPS to retract the pressing block 4 to the start position.

In this manner, the reference distance is measured thrice while imparting three differing pressing forces upon the tractor cover 13. Measurement of the reference distance for three times is necessary to investigate resilient deformation of the tractor cover 13 which changes with the strength of the pressing force. The reference distance thus measured will be used to improve accuracy of the form thickness measurement.

Next, a form to be measured is loaded in the pin feed tractor and a distance from the reference position to the form (hereinafter referred to as "actual distance") will be measured.

Referring to FIG. 4, measurement of the actual distance will be described.

Firstly, the contact of the switch 16 is checked in the same manner as is done in the measurement of the reference distance.

Assuming that the form includes a single sheet of paper, weak pressing force is imparted upon the form. To this end, the stepping motor 1 is forwardly rotated at a high pulse rate (460 PPS). Because pressing a single sheet of paper with strong force lowers the measurement accuracy, weak pressing force is imparted upon the paper. In this condition, the washer 6 is positioned Lf.s away from the reference position.

To measure Lf.s, the stepping motor 1 is reversely rotated at a low pulse rate (100 PPS). The number of phase change pulses (Sf.s) generated during the reversal movement of the stepping motor 1 is counted and stored in the non-volatile memory 22. The number of phase change pulses Sf.s is representative of the distance Lf.s. In order that the stepping motor 1 may not be pulled out before arriving at the reference position, the pulse rate is set to low (100 PPS) to generate strong torque.

Assuming that the form includes five to six sheets of paper, middle pressing force is imparted upon the form. To this end, the stepping motor 1 is forwardly rotated at a middle pulse rate (370 PPS). The middle pressing force is selected to a value such that no mark of depression by the projection 5 appears on pressure-sensitive sheets, and that a form consisting of plural sheets of paper is not detected thicker than an actual thickness, which may otherwise be detected thicker due to bulkiness of the form. Upon impingement of the projection 5 upon the form, the stepping motor 1 is pulled out and stops its rotation. In this condition, the washer 6 is positioned Lf.m away from the reference position.

To measure the distance Lf.m, the stepping motor 1 is reversely rotated at a low pulse rate (100 PPS) from the position where the stepping motor 1 is pulled out. The number of phase change pulses (Sf.m) generated during the reversal movement of the stepping motor 1 is counted and stored in the non-volatile memory 22. The number of phase change pulses Sf.m is representative of the distance Lf.m. In order that the stepping motor 1 may not be pulled out before arriving at the reference position, the pulse rate is set to low (100 PPS) to generate strong torque.

Assuming that the form includes eight sheets of paper, strong pressing force is imparted upon the form. To this end, the stepping motor 1 is forwardly rotated at a low pulse rate (250 PPS). The actual strength of the strong pressing force is selected to a value such that no mark of depression by the projection 5 appears on the sheets, and that a form consisting of plural sheets of paper is not detected thicker than an actual thickness, which may otherwise be detected thicker due to bulkiness of the form. Upon impingement of the projection 5 upon the form, the stepping motor 1 is pulled out and stops its rotation. In this condition, the washer 6 is positioned Lf.l distance away from the reference position.

To measure the distance Lf.l, the stepping motor 1 is reversely rotated at a low pulse rate (100 PPS) from the position where the stepping motor 1 is pulled out. The number of phase change pulses (Sf.l) generated during the reversal movement of the stepping motor 1 is counted and stored in the non-volatile memory 22. The number of phase change pulses Sf.l is representative of the distance Lf.s. In order that the stepping motor 1 may not be pulled out before arriving at the reference position, the pulse rate is set to low (100 PPS) to generate strong torque.

Upon measurement of the distance Lf.l, the stepping motor 1 is forwardly rotated at a pulse rate of 100 PPS to retract the pressing block 4 to the start position.

Based on the measurement results, the following computations are performed:

$$Sx.s=Ss.s-Sf.s \tag{1}$$

$$Sx.m=Ss.m-Sf.m \tag{2}$$

$$Sx.l=Ss.l-Sf.l \tag{3}$$

Further, two reference value Ref.1 and Ref.2 are set for comparison with the computation results wherein first reference value Ref.1 is smaller than second reference value Ref. 2.

When Sx.s is smaller than the first reference value Ref.1, it is determined that the form consists of a single sheet of paper. When Sx.m is greater than the first reference value Ref. 1 but is less than the second reference value Ref.1, then it is determined that the form consists of two to six sheets of paper. When Sx.l is greater than the second reference value Ref.2, then it is determined that the form consists of more than seven sheets of paper.

It should be noted that the values Ss.s, Sf.s and Ss.m need not be measured each time the form thickness is measured. These values are measured in advance and stored in the memory 22. Further, it is not necessary to measure Sf.m and Sf.l if it is determined that the form consists of a single sheet of paper. Also, it is not necessary to measure Sf.l if it is determined that the form includes less than eight sheets of paper.

The form thickness can be obtained by converting the number of phase change pulses Sx to a unit of length using a relation that one phase or one step corresponds to 0.01042 mm as described before.

Determination of the first and second reference values REF.1 and REF.2 will be described while referring to FIG. 8.

FIG. 8 shows various kinds of forms, their measured thickness, and their measured step number. The form thickness is measured using a high precision measuring instrument. From the data shown in FIG. 8, it can be appreciated that step number 25 can be used as a boundary for discriminating forms of a single sheet of paper from forms of plural sheets of paper. Also, step number 42 can be used as a boundary for discriminating forms of five or six sheets of paper from forms of eight sheets of paper. As such, 25 and 42 are used as the first and second reference values REF.1 and REF.2, respectively.

Next, operation of the form thickness measuring device 100 will be described with reference to FIGS. 6–7, 9–10 and 11(*a*) to 11(*d*).

Figure 9:
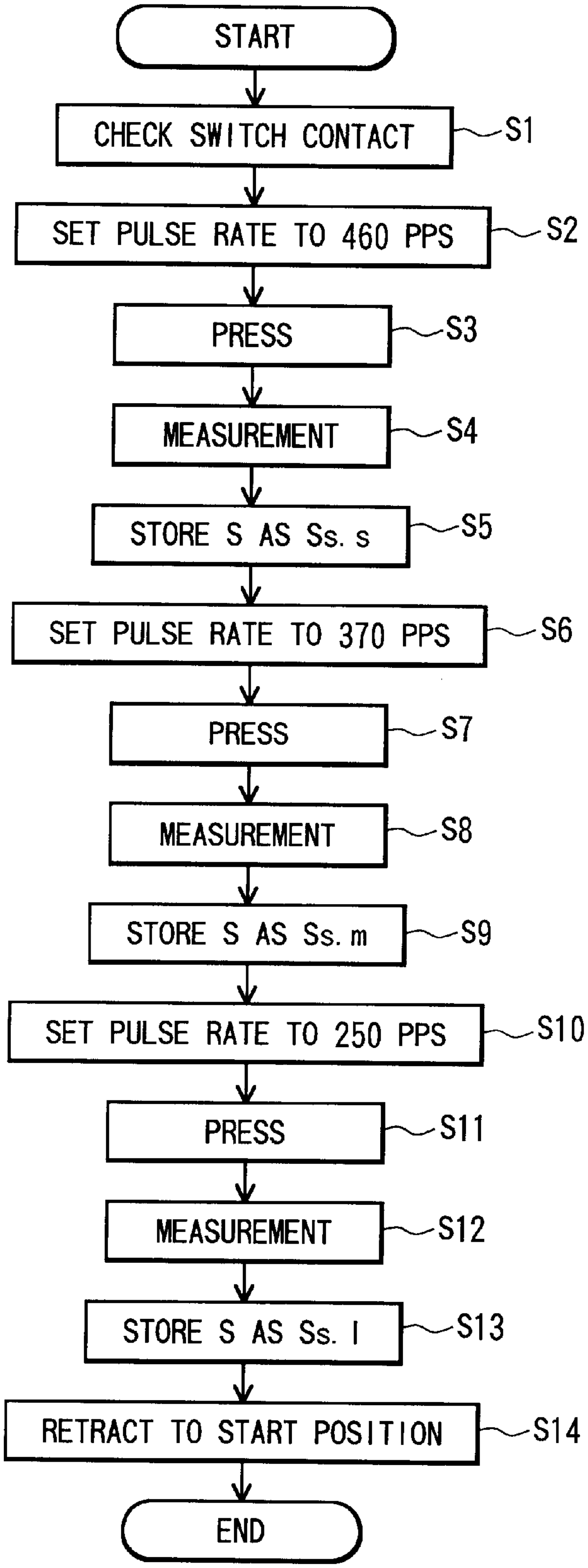
FIG. 9 is a flowchart illustrating a form thickness measurement control program according to the embodiment of the present invention.
Figure 11:
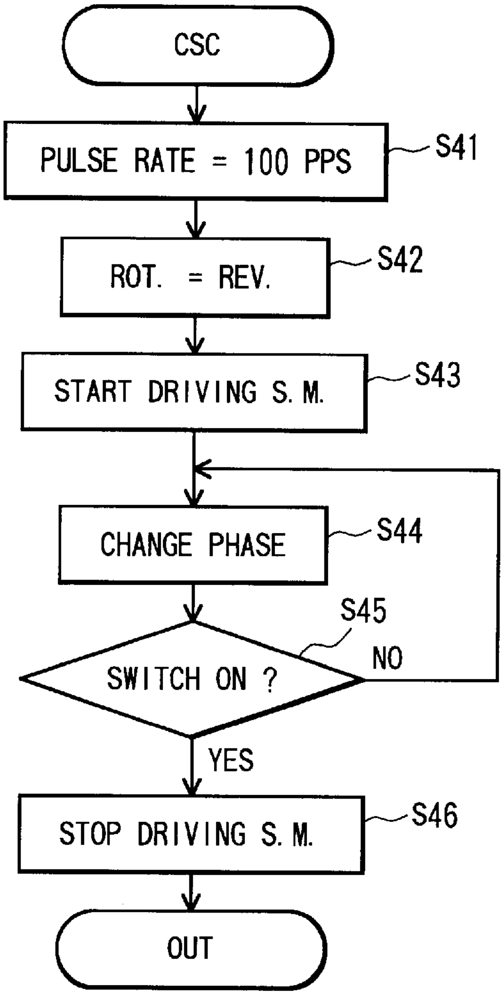
FIGS. 11(*a*) to 11(*d*) are flowcharts illustrating subroutines of the form thickness measurement control program according to the embodiment of the present invention.
Figure 11:
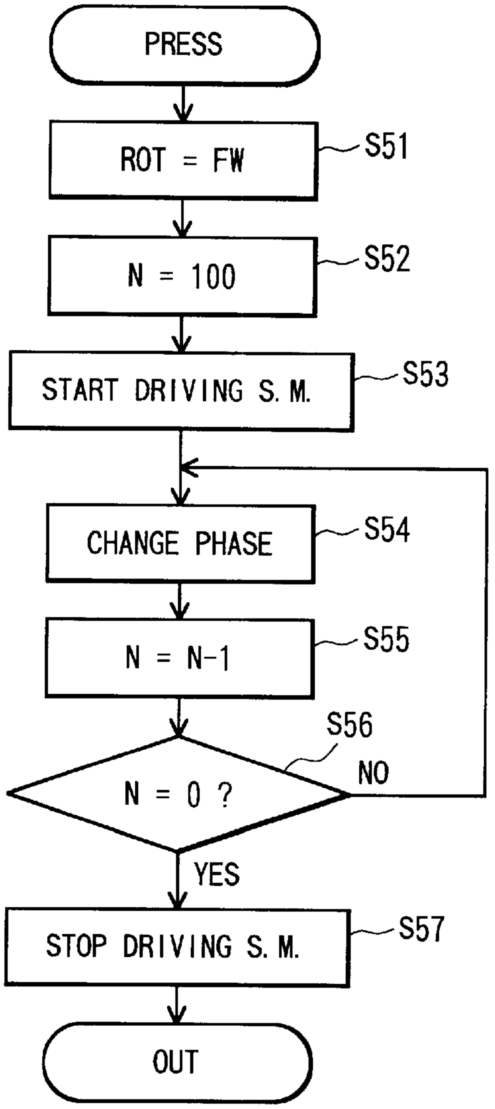
Figure 11:
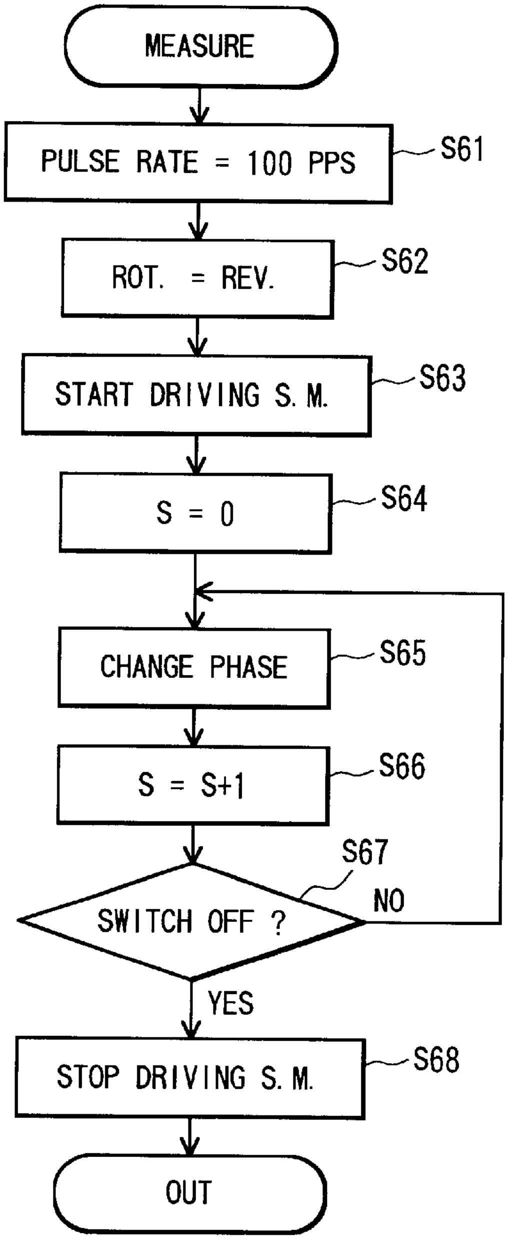
Figure 11:
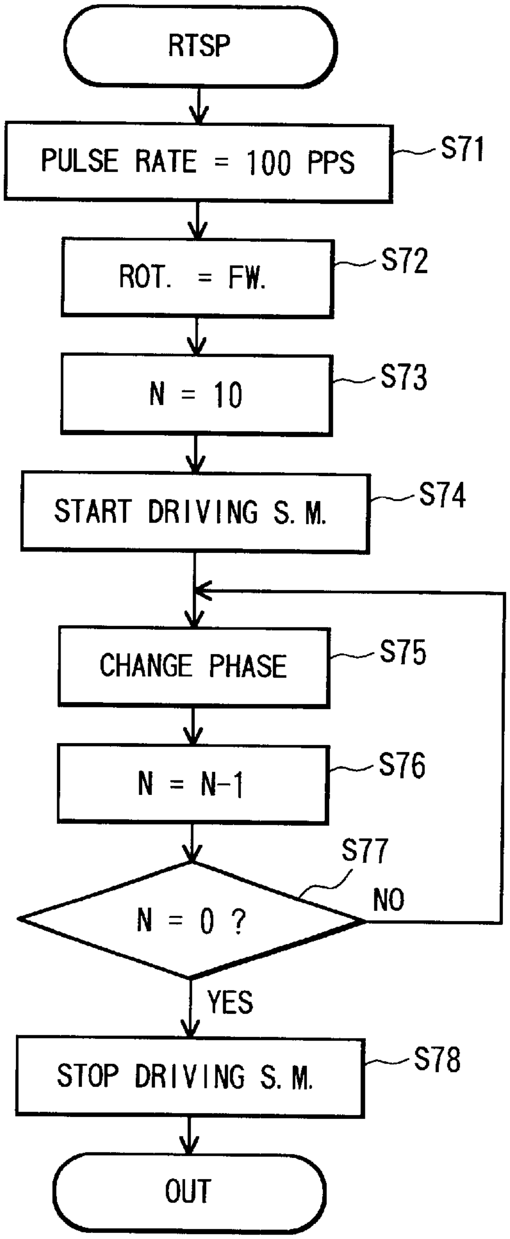

The flowchart of FIG. 9 is directed to the measurement of the reference distance described with reference to FIG. 3. First, check of switch contact (CSC) is executed (S1). The sub-routine of CSC is depicted in the flowchart of FIG. 11(*a*). As shown therein, the pulse rate is set to 100 PPS (S41) and the drive direction set signal is rendered low to instruct the stepping motor drive circuit 30 to rotate the stepping motor 1 reversely (S42). When the drive signal is applied to the stepping motor drive circuit 30, the stepping motor 1 starts rotating reversely (S43). The stepping motor 1 keeps on rotating while changing phases (S44), and the pressing block 4 moves toward the substrate 7. When it is determined that the switch 16 is rendered ON (S45: YES) by the contact of the washer 6 with the contact points 15A and 15B, the stepping motor 1 is pulled out and stops its rotation (S46). Through these processes, it can be confirmed that the switch 16 is in order.

When the sub-routine of FIG. 11(*a*) is ended, the routine returns to S2 of the main routine of FIG. 9 where the pulse rate is set to 460 PPS (S2). Then, pressing process is executed (S3). The sub-routine of the pressing process is depicted in the flowchart of FIG. 11(*b*). As shown therein, the drive direction set signal is rendered high to instruct the stepping motor drive circuit 30 to rotate the stepping motor 1 forwardly (S51). Then, N is set to 100 (S52) where N indicates a predetermined number of phase change pulses or a predetermined number of steps. N is set to a number corresponding to a distance slightly longer than the distance to be measured. The gap sensor 10 is designed so that the projection 5 is brought into contact with the inner surface of the tractor cover 13 when it is moved from the position where the washer 6 is in the reference position by a distance corresponding to 97 steps. When the drive signal is applied to the stepping motor drive circuit 30, the stepping motor 1 starts rotating forwardly (S53). The stepping motor 1 keeps on rotating while changing phases (S54). Each time the phase changes, N set to 100 is decremented by one (S55). Immediately before N becomes equal to zero (S56: YES), the projection 5 impinges against the tractor cover 13, so that the stepping motor 1 is pulled out and stops its rotation (S57). Because the stepping motor 1 is rotating at a high pulse rate (460 PPS), it imparts weak pressing force upon the tractor cover 13.

When the sub-routine of FIG. 11(*b*) is ended, the routine returns to S4 of the main routine of FIG. 9 where measurement process is executed. The sub-routine of the measurement process is depicted in the flowchart of FIG. 11(*c*). As shown therein, the pulse rate is set to 100 PPS (S61) and the drive direction set signal is rendered low to instruct the stepping motor drive circuit 30 to rotate the stepping motor 1 reversely (S62). When the drive signal is applied to the stepping motor drive circuit 30, the stepping motor 1 starts rotating reversely (S63). At this time, S is set to zero (S64). The stepping motor 1 keeps on rotating while changing phases (S65). Each time the phase changes, S is incremented by one (S66). In accordance with the reverse rotations of the stepping motor 1, the pressing block 4 moves toward the substrate 7. When it is determined that the switch 16 is rendered ON (S67: YES) by the contact of the washer 6 with the contact points 15A and 15B, the stepping motor 1 is pulled out and stops its rotation (S68).

When the sub-routine of FIG. 11(*c*) is ended, the routine returns to S5 of the main routine of FIG. 9 where the number of phases or steps S counted in the preceding measurement process is stored as Ss.s in the non-volatile memory 22. Thereafter, the pulse rate is set to 370 PPS (S6) and the pressing process as described with reference to the sub-routine of FIG. 11(*b*) is executed (S7). In this case, because the stepping motor 1 is rotating at a middle pulse rate (370 PPS), it imparts middle pressing force upon the tractor cover 13. After the pressing process (S7), the measurement process as described with reference to the sub-routine of FIG. 11(*c*) is executed (S8). Then, the value of S is stored as Ss.m (S9).

Next, the pulse rate is set to 250 PPS (S10), and the pressing process is executed (S11). In this case, because the stepping motor 1 is rotating at a low pulse rate (250 PPS), it imparts strong pressing force upon the tractor cover 13. After the pressing process (S11), the measurement process is similarly executed (S12). Then, the value of S is stored as Ss.l (S13).

Following S13, the pressing block 4 is retracted to the start position (S14). The process of retraction to start position (RTSP) is depicted in the sub-routine of FIG. 11(*d*). As shown therein, the pulse rate is set to 100 PPS (S71) and the drive direction set signal is rendered high to instruct the stepping motor drive circuit 30 to rotate the stepping motor 1 forwardly (S72). Then, N is set to 10 (S73) where N indicates a predetermined number of phase change pulses. 10 set to N corresponds to a distance from the reference position to the start position. When the drive signal is applied to the stepping motor drive circuit 30, the stepping motor 1 starts rotating forwardly (S74). The stepping motor 1 keeps on rotating while changing phases (S75). Each time the phase changes, N set to 10 is decremented by one (S76). When N becomes equal to zero (S77: YES), application of the drive signal to the drive circuit 30 is stopped, thereby stopping rotations of the stepping motor 1 (S78). Through the process of RTSP, the pressing block 4 is retracted to the start position and the main routine of FIG. 9 is ended.

Figure 10:
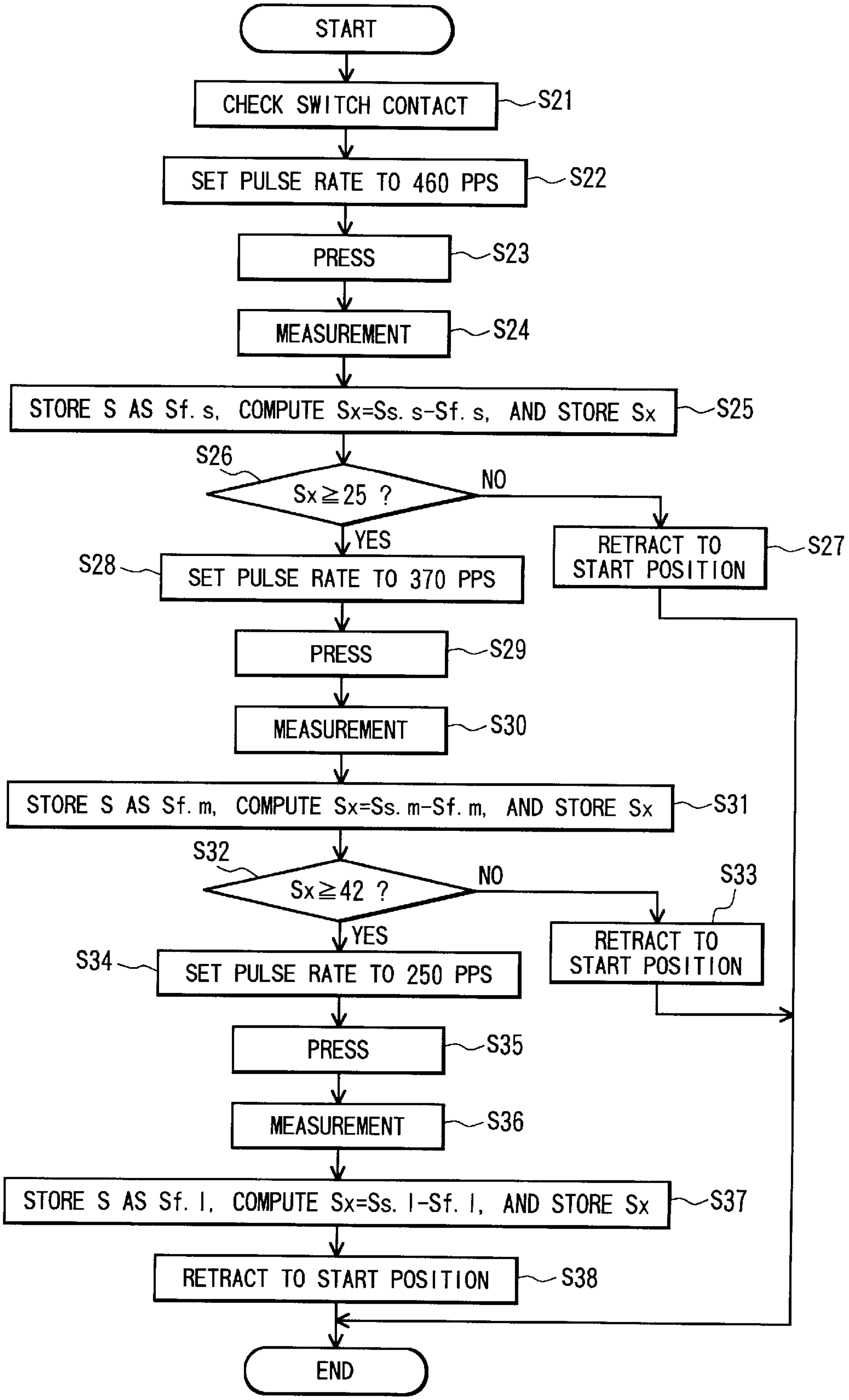
FIG. 10 is a flowchart illustrating another form thickness measurement control program according to the embodiment of the present invention.

Next, measurement of the actual distance will be described with reference to the flowchart of FIG. 10.

First, check of switch contact (CSC) is executed (S21) in the same manner as in S1 of the FIG. 9 flowchart. The sub-routine of CSC is depicted in the flowchart of FIG. 11(*a*). When it is confirmed that the switch 16 is in order, the pulse rate is set to 460 PPS (S22). Then, pressing process is executed (S23) in the same manner as in S3 of the FIG. 9 flowchart. The sub-routine of the pressing process is depicted in the flowchart of FIG. 11(*b*). In this occasion, weak pressing force is imparted upon the foam.

Following the pressing process (S23), measurement process is executed (S24) in the same manner as in S4 of the FIG. 9 flowchart. The sub-routine of the measurement process is depicted in the flowchart of FIG. 11(*c*).

When the measurement process (S24) is ended, the value of S is stored as Sf.s in the non-volatile memory 22, Ss.s stored therein is read, computation of Sx=Ss.−Sf.s is performed, and the resultant data Sx is stored in the memory 22 (S25).

In S26, determination is made as to whether or not Sx is equal to or greater than the first reference value REF.1 which is set to 25 in this embodiment. When Sx is less than 25 (S26: NO), then it is determined that the form consists of a single sheet of paper. Because in this case, no further determination is necessary, the pressing block 4 is retracted to the start position (S27) and the program of FIG. 10 is ended.

When Sx is equal to or greater than 25 (S26: YES), it is determined that the form does not consist of only one sheet of paper but consists of five sheets of paper or more.

Then, the pulse rate is set to 370 PPS (S28) and the pressing process as described with reference to the sub-routine of FIG. 11(*b*) is executed (S29). In this case, because the stepping motor 1 is rotating at a middle pulse rate (370 PPS), it imparts middle pressing force upon the foam. After the pressing process (S29), the measurement process as described with reference to the sub-routine of FIG. 11(*c*) is executed (S30). Then, the value of S is stored as Sf.m in the non-volatile memory 22, Ss.m stored therein is read, computation of Sx=Ss.m−Sf.m is performed, and the resultant data Sx is overwritten in the memory 22 (S31).

In S32, determination is made as to whether or not Sx is equal to or greater than the second reference value REF.2 which is set to 42 in this embodiment. When Sx is less than 42 (S32: NO), then it is determined that the form consists of five or six sheets of paper. Because in this case, no further determination is necessary, the pressing block 4 is retracted to the start position (S33) and the program of FIG. 10 is ended.

When Sx is equal to or greater than 42 (S32: YES), it is determined that the form includes eight sheets of paper. Then, the pulse rate is set to 250 PPS (S34) and the pressing process as described with reference to the sub-routine of FIG. 11(*b*) is executed (S35). In this case, because the stepping motor 1 is rotating at a low pulse rate (250 PPS), it imparts strong pressing force upon the tractor cover 13. After the pressing process (S35), the measurement process as described with reference to the sub-routine of FIG. 11(*c*) is executed (S36). Then, the value of S is stored as Sf.l in the non-volatile memory 22, Ss.l stored therein is read, computation of Sx=Ss.l−Sf.l is performed, and the resultant data Sx is overwritten in the memory 22 (S37). Then, the pressing block 4 is retracted to the start position (S33) and the program of FIG. 10 is ended.

The counted step number Sx stored in S25, S31 or S37 is read from the memory 22 and is converted to a unit of thickness as described before. Through the conversion, the thickness of the form loaded in the pin feed tractor is obtained.

While an exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. A thickness measuring device comprising:

a substrate;

a stepping motor supported on said substrate and having a rotor shaft forwardly and reversely rotatable about said rotor shaft;

a translating mechanism for translating rotations of said rotor shaft into a linear movement;

a pressing block formed with a projection, said pressing block being coupled to said rotor shaft through said translating mechanism for moving said projection toward and away from an object to be measured supported on a supporting plate in accordance with forward and reverse rotations of said stepping motor;

a control unit for controlling a pulse rate of said stepping motor, said pulse rate controlling a pressing force applied by said pressing block, to move said projection from a predetermined fixed position to the object and then to backwardly move said projection from the object to the predetermined fixed position, and for computing a thickness of the object based on an actual amount of rotations of said stepping motor detected when said projection is moved a one-way distance between the predetermined fixed position and the object, wherein said controllable pulse rate is used to free said computed thickness from the influence of resilient deformation of said supporting plate.

2. The thickness measuring device according to claim 1, wherein said control unit comprises a non-volatile memory storing therein a reference amount of rotations of said stepping motor corresponding to a distance between the predetermined fixed position and the supporting plate, and computing means for computing the thickness of the object based on a subtracted amount of rotations obtained by subtracting the actual amount of rotations from the reference amount of rotations.

3. The thickness measuring device according to claim 2, wherein said control unit further controls said stepping motor to move said projection from the predetermined fixed position to the supporting plate and then to backwardly move said projection from the object to the predetermined fixed position, and wherein said control unit further comprises detection means for detecting the reference amount of rotations of said stepping motor by moving said projection a one-way distance between the predetermined fixed position and the supporting plate, said detection means storing the reference amount of rotations in said non-volatile memory.

4. The thickness measuring device according to claim 3, wherein a first set of data including the actual amount of rotations and the reference amount of rotations is detected while rotating said stepping motor at a first pulse rate, and said computing means further computes a first subtracted amount of rotations based on the first set of data, and wherein said control unit further comprises comparison means for comparing the first subtracted amount of rotations with a first reference value, and determining means for determining that the object falls into a first range of thickness when said comparison means indicates that the first subtracted amount of rotations is less than the first reference value and that the object is out of the first range of thickness when said comparison means indicates that the first subtracted amount of rotations is equal to or greater than the first reference value.

5. The thickness measuring device according to claim 4, wherein a second set of data including the actual amount of rotations and the reference amount of rotations is detected while rotating said stepping motor at a second pulse rate lower than the first pulse rate, and said computing means further computes a second subtracted amount of rotations based on the second set of data, and wherein said comparison means further compares the second subtracted amount of rotations with a second reference value greater than the first reference value, and said determining means further determines that the object falls into a second range of thickness when said comparison means indicates that the second subtracted amount of rotations is greater than the first reference value but less than the second reference value and that the object falls into a third range of thickness when said comparison means indicates that the second subtracted value is greater than the second reference value, wherein values in the first range of thickness is smaller than values in the second range of thickness, and the values in the second range of thickness is smaller than values in the third range of thickness.

6. The thickness measuring device according to claim 5, wherein when said determining means determines that the object falls into the third range of thickness, said control unit controls said stepping motor to rotate at a third pulse rate lower than the second pulse rate to compute the thickness of the object.

7. The thickness measuring device according to claim 6, wherein said control unit computes the thickness of the object based on the first subtracted amount of rotations when said determining means determines that the object falls into the first range of thickness.

8. The thickness measuring device according to claim 7, wherein said control unit computes the thickness of the object based on the second subtracted amount of rotations when said determining means determines that the object falls into the second range of thickness.

9. The thickness measuring device according to claim 8, wherein a third set of data including the actual amount of rotations and the reference amount of rotations is detected while rotating said stepping motor at the third pulse rate lower than the second pulse rate, said computing means further computes a third subtracted amount of rotations based on the third set of data, and said control means computes the thickness of the object based on the third set of data.

10. A printer comprising:

a print head;

a pin feed tractor for feeding a form document past said print head, the pin feed tractor having a tractor plate and a tractor cover arranged in parallel with each other to form a gap therebetween into which the form document is inserted; and a form thickness measuring device comprising:

a substrate;

a stepping motor supported on said substrate and having a rotor shaft forwardly and reversely rotatable about said rotor shaft;

a translating mechanism for translating rotations of said rotor shaft into a linear movement;

a pressing block formed with a projection, said pressing block being coupled to said rotor shaft through said translating mechanism for moving said projection toward and away from the form document supported on said tractor cover through an opening formed on said tractor plate in accordance with forward and reverse rotations of said stepping motor; and a control unit for controlling a pulse rate of said stepping motor, said pulse rate controlling a pressing force applied by said pressing block, to move said projection from a predetermined fixed position to the form document and then to backwardly move said projection from the form document to the predetermined fixed position, and for computing a thickness of the form document based on an actual amount of rotations of said stepping motor detected when said projection is moved a one-way distance between the predetermined fixed position and the form document, wherein said controllable pulse rate is used to free said computed thickness from the influence of resilient deformation of said supporting plate.

11. The printer according to claim 10, wherein said control unit further controls said stepping motor to move said projection from the predetermined fixed position to the tractor cover and then to backwardly move said projection from the tractor cover to the predetermined fixed position, and wherein said control unit comprises:

detection means for detecting a reference amount of rotations of said stepping motor by moving said projection a one-way distance between the predetermined fixed position and said tractor cover;

a non-volatile memory, said detection means storing the reference amount of rotations in said non-volatile memory; and computing means for computing a difference between the actual amount of rotations and the reference amount of rotations, and computing the thickness of the form document based on the difference.

12. The printer according to claim 11, wherein said control unit further comprises pulse rate changing means for changing a pulse rate of the rotations of said stepping motor, said pulse rate changing means changes the pulse rate based on the difference.

13. The printer according to claim 12, wherein said pulse rate changing means decreases the pulse rate used for moving said projection from the predetermined fixed position to the form document and to said tractor cover when the difference is greater than a reference value.

14. A thickness measuring method comprising the steps of:

a-1) forwardly rotating a stepping motor at a first pulse rate to linearly move a projection toward a supporting plate from a predetermined fixed position;

b-1) imparting a first pressing force corresponding to the first pulse rate upon said supporting plate when said projection impinges against said supporting plate;

c-1) pulling out said stepping motor caused by impingement of said projection against said supporting plate;

d-1) reversely rotating said stepping motor at a second pulse rate to move said projection back to the predetermined fixed position;

e-1) detecting a first amount of rotations during reverse rotations of said stepping motor in step d-1);

f-1) forwardly rotating said stepping motor at the first pulse rate to linearly move said projection toward an object to be measured supported on said supporting plate from the predetermined fixed position;

g-1) imparting the first pressing force corresponding to the first pulse rate upon said object and said supporting plate when said projection impinges against said object;

h-1) reversely rotating said stepping motor at the second pulse rate to move said projection back to the predetermined fixed position;

i-1) detecting a second amount of rotations during reverse rotations of said stepping motor in step h-1);

j-1) computing a first difference between the first amount of rotations and the second amount of rotations;

k-1) comparing the first difference with a first reference value; and l-1) computing a thickness of the object based on the first difference when comparison result in step k-1) indicates that the first difference is less than the first reference value.

15. The thickness measuring method according to claim 14, further comprising the steps of:

a-2) forwardly rotating said stepping motor at a third pulse rate lower than the first pulse rate to linearly move said projection toward said supporting plate from the predetermined fixed position;

b-2) imparting a second pressing force corresponding to the third pulse rate upon said supporting plate when said projection impinges against said supporting plate;

c-2) pulling out said stepping motor caused by impingement of said projection against said supporting plate in step b-2);

d-2) reversely rotating said stepping motor at a fourth pulse rate to move said projection back to the predetermined fixed position;

e-2) detecting a third amount of rotations during reverse rotations of said stepping motor in step d-2);

f-2) forwardly rotating said stepping motor at the third pulse rate to linearly move said projection toward the object supported on said supporting plate from the predetermined fixed position;

g-2) imparting the second pressing force corresponding to the third pulse rate upon said object and said supporting plate when said projection impinges against said object;

h-2) reversely rotating said stepping motor at the fourth pulse rate to move said projection back to the predetermined fixed position;

i-2) detecting a fourth amount of rotations during reverse rotations of said stepping motor in step h-2);

j-2) computing a second difference between the third amount of rotations and the fourth amount of rotations;

k-2) comparing the second difference with a second reference value greater than the first reference value; and l-2) computing a thickness of the object based on the second difference when comparison result in step k-1) indicates that the first difference is equal to or greater than the first reference value and comparison result in step k-2) indicates that the second difference is less than the second reference value.

16. The thickness measuring method according to claim 15, further comprising the steps of:

a-3) forwardly rotating said stepping motor at a fifth pulse rate lower than the third pulse rate to linearly move said projection toward said supporting plate from the predetermined fixed position;

b-3) imparting a third pressing force corresponding to the fifth pulse rate upon said supporting plate when said projection impinges against said supporting plate;

c-3) pulling out said stepping motor caused by impingement of said projection against said supporting plate in step b-3);

d-3) reversely rotating said stepping motor at a sixth pulse rate lower than the fourth pulse rate to move said projection back to the predetermined fixed position;

e-3) detecting a fifth amount of rotations during reverse rotations of said stepping motor in step d-3);

f-3) forwardly rotating said stepping motor at the fifth pulse rate to linearly move said projection toward the object supported on said supporting plate from the predetermined fixed position;

g-3) imparting the third pressing force corresponding to the fifth pulse rate upon said object and said supporting plate when said projection impinges against said object;

h-3) reversely rotating said stepping motor at the sixth pulse rate lower than the fourth pulse rate to move said projection back to the predetermined fixed position;

i-3) detecting a sixth amount of rotations during reverse rotations of said stepping motor in step h-3);

j-3) computing a third difference between the fifth amount of rotations and the sixth amount of rotations;

k-3) computing a thickness of the object based on the third difference when comparison result in step k-1) indicates that the first difference is greater than the first reference value, comparison result in step k-2) indicates that the second difference is equal to or greater than the second reference value.

17. The thickness measuring method according to claim 16, wherein the second pulse rate, fourth pulse rate and sixth pulse rate are equal to one another.

* * * * *